Jan. 12, 1954   J. H. SENIOR ET AL   2,665,453
FIBER BLENDING APPARATUS
Filed May 26, 1950   7 Sheets-Sheet 2

Inventors:
John H. Senior
Harmon B. Riehl
by their Attorneys
Howson & Howson

Jan. 12, 1954  J. H. SENIOR ET AL  2,665,453
FIBER BLENDING APPARATUS
Filed May 26, 1950  7 Sheets-Sheet 3

Inventors:
John H. Senior
Harmon B. Riehl
by their Attorneys
Howson & Howson

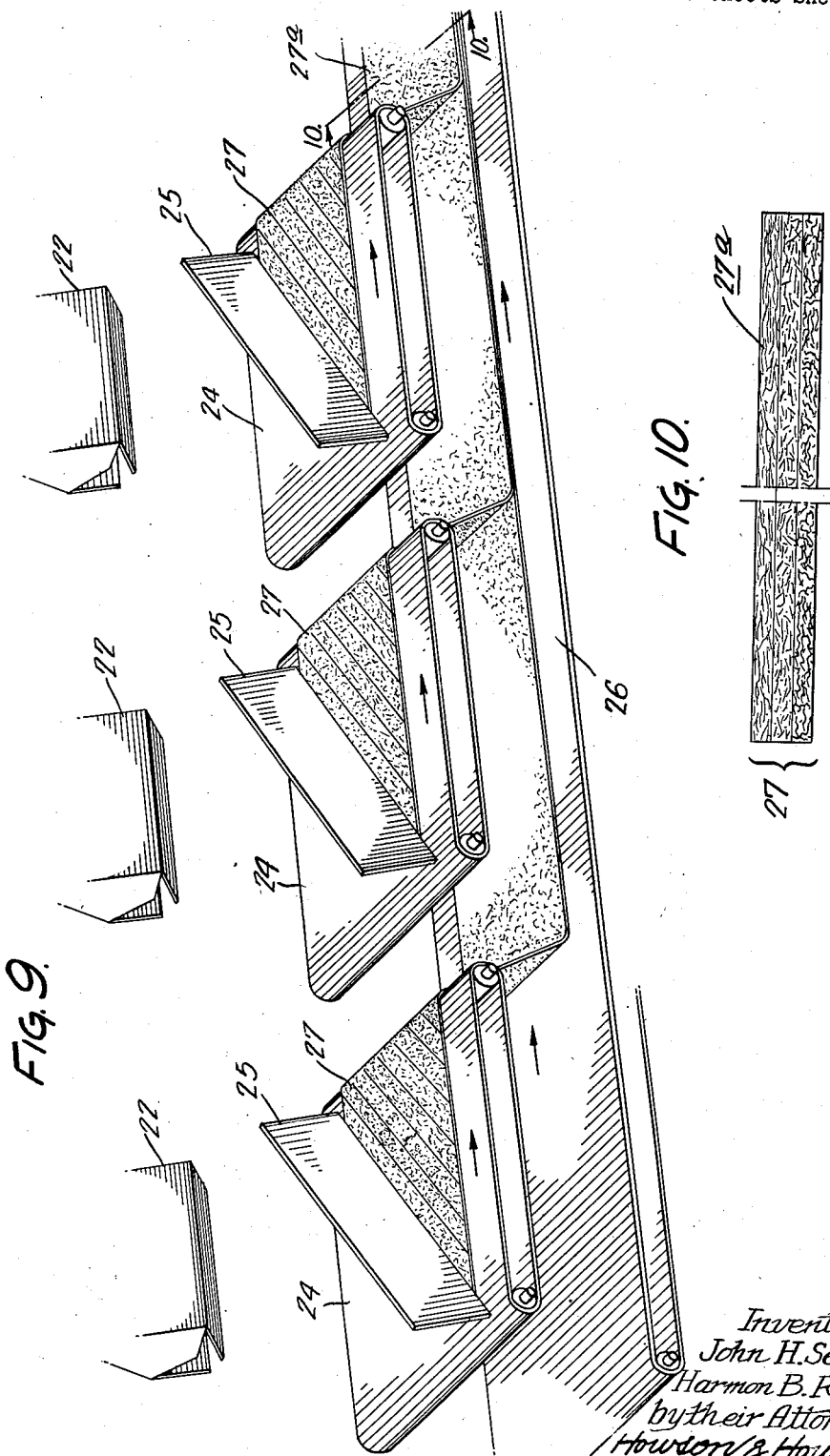

Jan. 12, 1954
J. H. SENIOR ET AL
2,665,453
FIBER BLENDING APPARATUS
Filed May 26, 1950
7 Sheets-Sheet 5
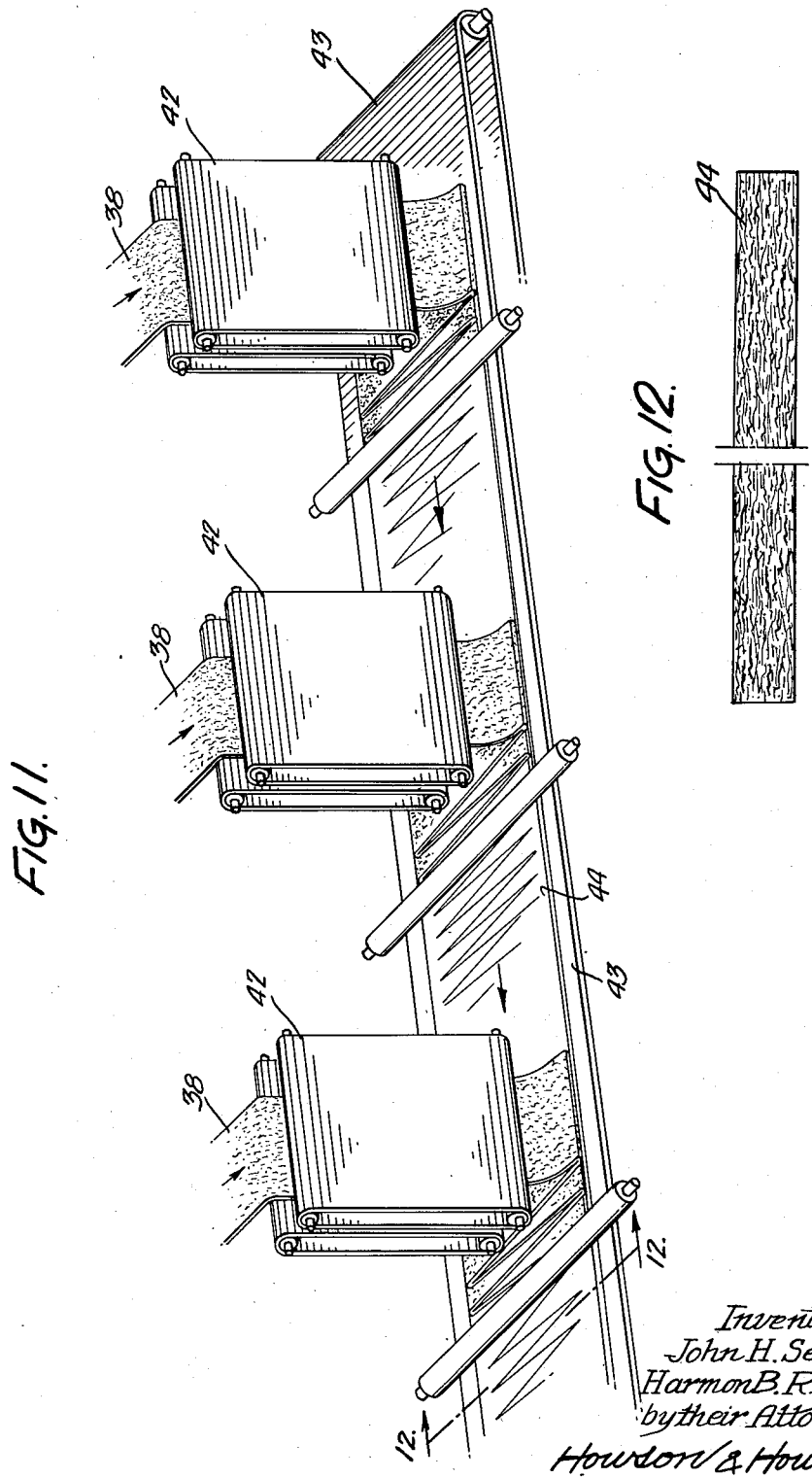
Inventors:
John H. Senior
Harmon B. Riehl
by their Attorneys
Howson & Howson

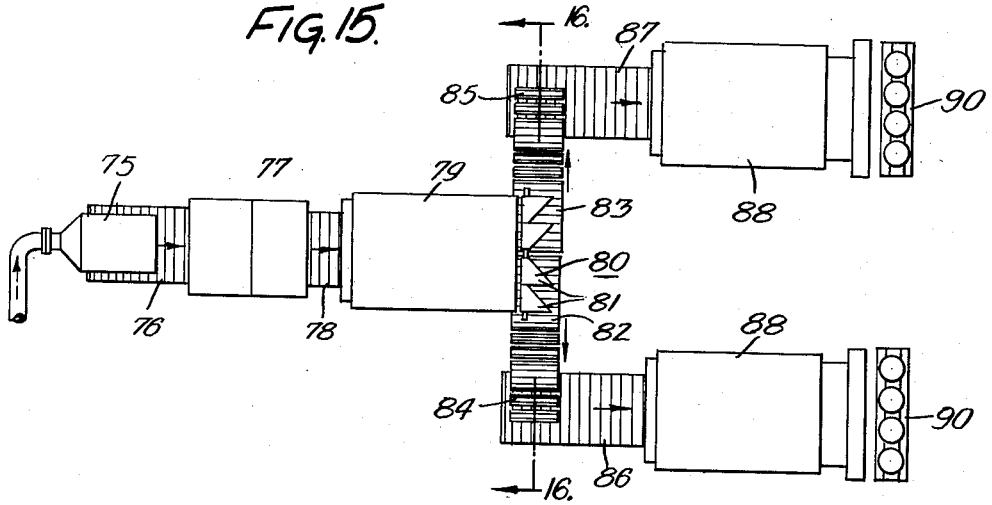
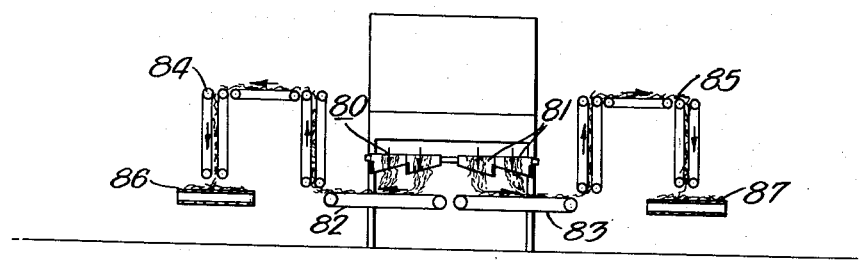
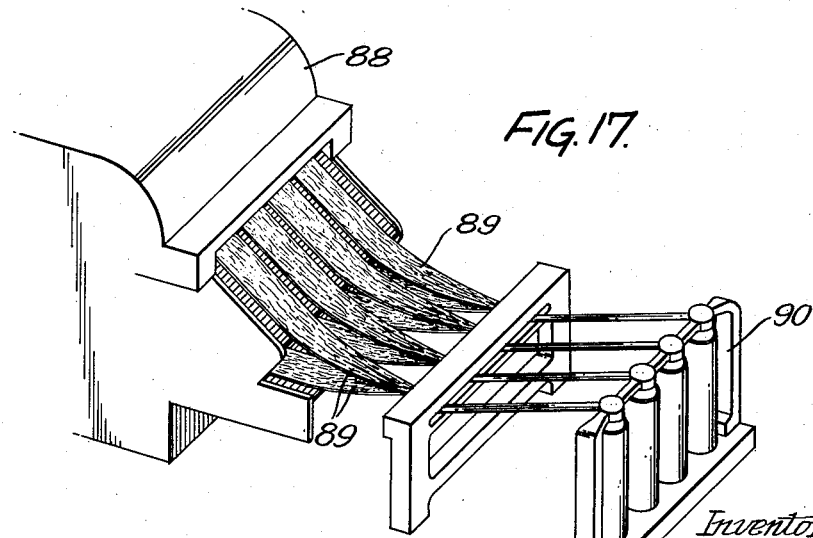

Patented Jan. 12, 1954

2,665,453

UNITED STATES PATENT OFFICE 2,665,453

FIBER BLENDING APPARATUS

John H. Senior, Germantown, and Harmon B. Riehl, Norristown, Pa., assignors to Proctor & Schwartz, Inc., Philadelphia, Pa., a corporation of Pennsylvania Application May 26, 1950, Serial No. 164,502

17 Claims. (Cl. 19—146)

This invention relates to fibre treating apparatus and more particularly to apparatus and methods for mechanically blending or mixing different types of fibres together.

The practice generally followed heretofore in mixing or blending textile fibres consists of manually spreading each one of the different types of fibres in uniform relatively superimposed layers in a large room or enclosure to form a sandwich-like mat comprising the proper proportions of the different types of fibres. The workers would then manually grasp a vertical section of the fibres and place it on a conveyor or belt leading to some further fibre processing machine.

Where large quantities of fibres are mixed in this manner the restricted space allowed for this mixing invariably results in a rather thick pile of fibres and the workmen are unable to grasp an entire vertical section at one time and thus the correct proportion of each component is not placed on the feed conveyor at the same time.

Attempts were made to obtain mixing by first picking each component and blowing it into an enclosure or vented room. However, this did not give satisfactory results as the lighter fibres were separated from the heavier ones and floated to the edges of the pile thus effectively separating the fibres instead of mixing them. These methods entailed a great amount of labor with very unsatisfactory results; furthermore, they necessitated passing the fibrous mass several times through picking machines to obtain satisfactory blending which caused injury and breakage of the fibres.

To obtain correct blending or mixing of fibres, it is very important that the various ingredients entering into a blend or mix should be first opened or broken down to approximately the same size of particles, and since all fibrous materials are shipped in tightly compressed bales, it is necessary to pass these through some picking or opening machine to reduce the large chunks to smaller particles for better dispersal of the fibres in blending.

Bearing the foregoing in mind, the principal object of the present invention is to provide novel apparatus and method for blending different types of fibres to form a homogeneous mixture.

Another object of the present invention is to provide means and methods to obtain intimate mixing or blending of fibres in accurate proportions with the least amount of handling and machining.

A further object of the present invention is to provide a novel blending system having the advantages and characteristics set forth which is entirely efficient and effective in operation and use.

These and other objects of the present invention and the various features and details of the operation and construction thereof are hereinafter more fully set forth and described with reference to the accompanying drawings, in which:

Fig. 9 is a perspective view showing three fibres blended by the present system being discharged from the automatic weighing feeds and blended together into a composite multi-layer mat;

Fig. 10 is a sectional view taken on line 10—10, Fig. 9 showing the placement of the different fibres in the composite multi-layer mat;

Fig. 11 is a perspective view showing the web being discharged from the initial carding machine and placed onto a conveyor by means of three intermediate feeds;

Fig. 12 is a sectional view taken on line 12—12, Fig. 11 showing the distribution of the fibres in the web formed by the intermediate feeds;

Fig. 15 is a schematic plan view showing a modified form of arrangement of machines in the final stage of the blending system;

Fig. 16 is a sectional view taken on the line 16—16, Fig. 15 showing the web being discharged from the initial carding machine; and Fig. 17 is a perspective view showing the web being discharged from the final carding machine of the modification shown in Fig. 15.

The method of blending natural and synthetic fibres according to the present invention comprises essentially forming a plurality of mats, each mat containing only one type of fibre. These separate mats are then placed in superimposed relation to form a composite multi-layer mat containing the proper proportion of each of the separate types of fibres to be blended. This composite multi-layer mat is then thoroughly mixed and subjected to suitable carding operations to form the finished slivers having a homogeneous distribution of the different types of fibres throughout.

Figure 1:
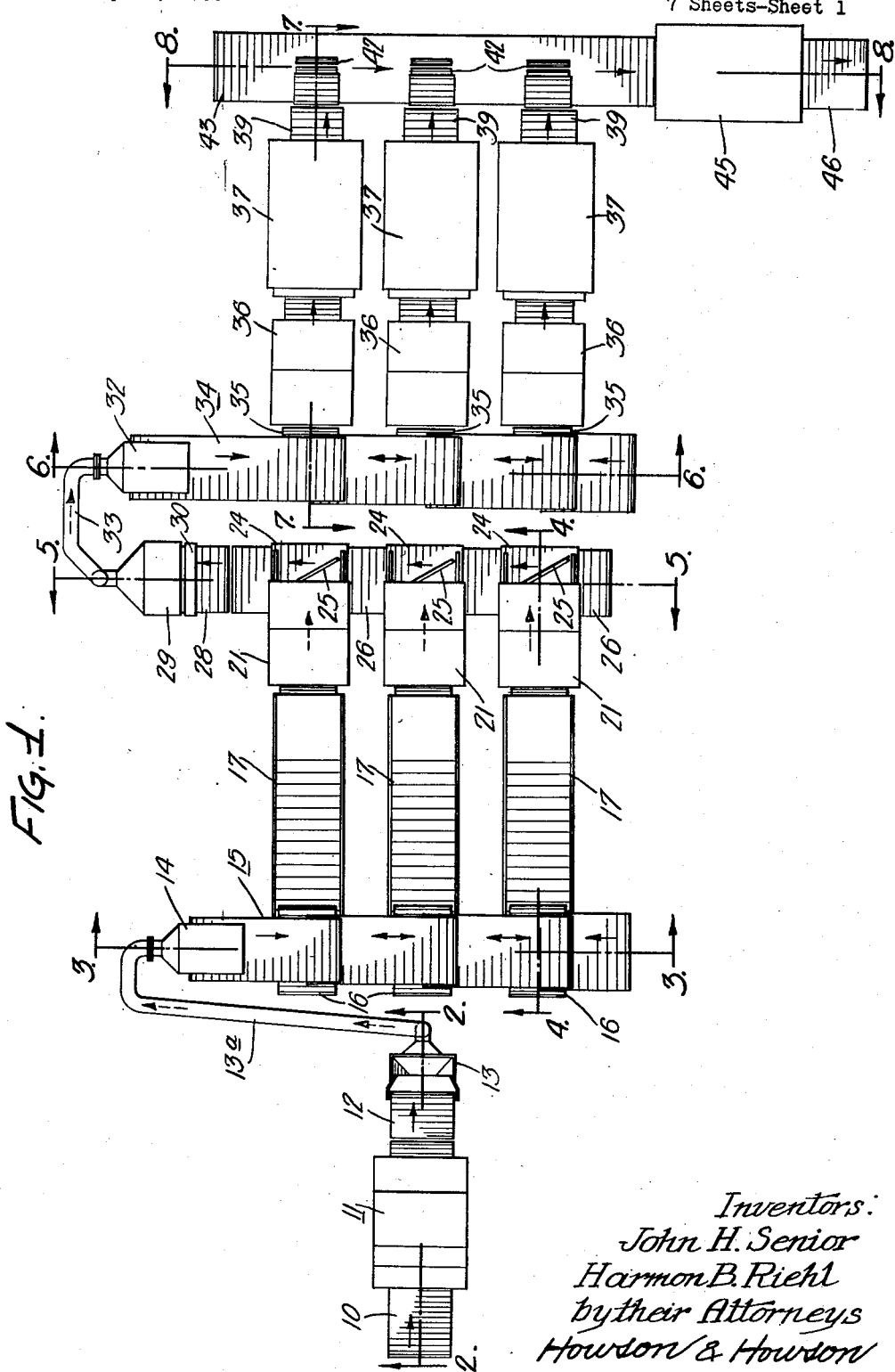
Fig. 1 is a schematic plan view of the blending system made in accordance with the present invention.
Figure 2:
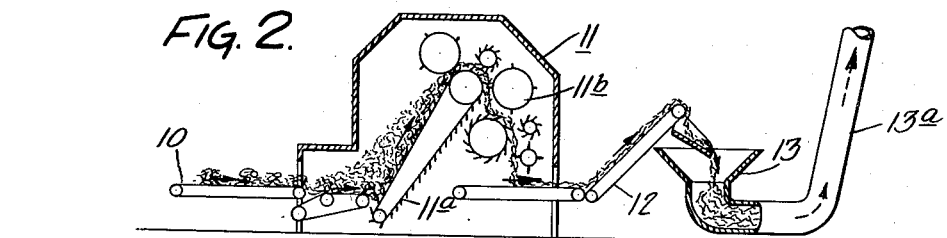
Figs. 2 to 8 are sectional views taken along correspondingly numbered lines in Fig. 1 and showing the various steps in the blending system.

With reference to the embodiment shown in Fig. 1, fibrous material taken from bales is placed on a conveyor 10 leading into a preparatory opener 11. Here the heavy masses and wads of fibrous material are picked up by a pin conveyor 11a and fed to breaker rolls 11b which break down the heavy masses of fibres. The fibres are discharged from the opener 11 and fed to an upwardly inclined conveyor 12 which in turn deposits the material into a hopper 13 from which it is conveyed by suction through a duct 13a to a condenser 14. The condenser 14 may be of the type shown and described in United States Patent No. 2,452,427 issued October 28, 1948. The condenser 14, in addition to transporting the fibres, also removes broken particles of the fibre, dirt, and other foreign material from the fibres.

Figure 3:
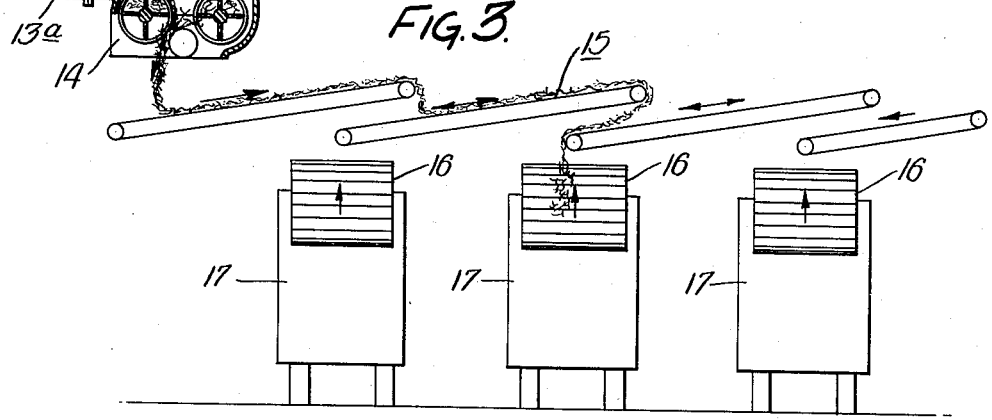
Figure 4:
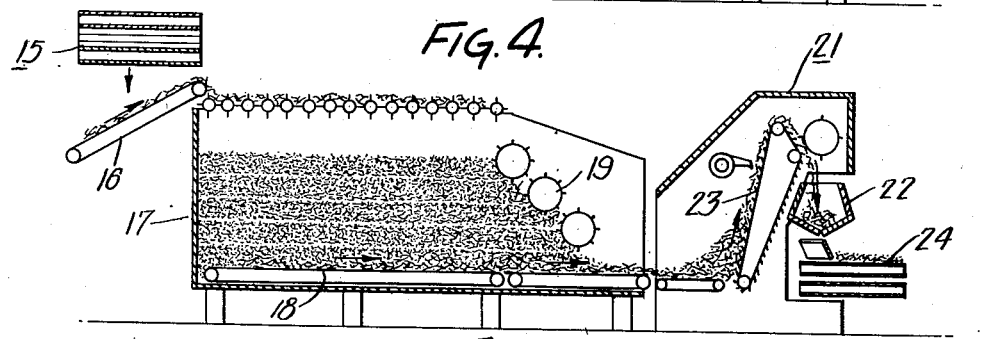
Figure 5:
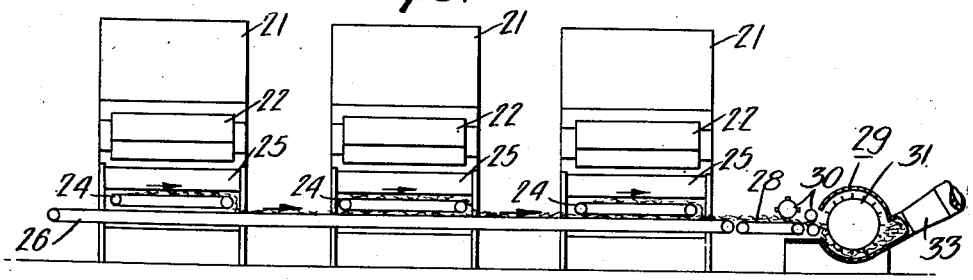

The fibres are discharged from the condenser 14 onto a conveyor system generally designated at 15. The conveyor system 15, as shown in Fig. 3, comprises a series of four apron conveyors arranged and operable so that by reversing one or more of the conveyors the material discharged from the condenser 14 may be deposited upon any one of the upwardly inclined conveyor belts 16 which lead to distributing bins 17. The distributing bins 17 serve to store the fibres and also provide a constant supply of fibres to the blending system.

The distributing bins 17 preferably are of the type shown and described in United States Patent No. 2,433,790, issued December 30, 1947, and have a conveyor 18 on the lower surface thereof which feeds the fibres or material placed in the bin to a series of breaking down rolls 19. In the present instance, three distributing bins 17 are shown placed opposite to the discharge points of the conveyor system 15 and a different type of fibre is placed in each of the bins 17. It will be observed, however, that any number of bins 17 may be provided, the amount being determined by the number of different types of material it is desired to blend.

While the bins are being filled with prepared material, the bottom apron remains stationary. When the various bins have been filled aprons 18 are started in motion to move the mass toward the breaking down rolls 19 to deliver the fibrous material to weighing feeders 21, where the fibres are placed in a weighing hopper 22 by means of a pin conveyor 23. The weighing hopper 22 continuously drops a predetermined amount of fibres onto a conveyor belt 24. The fibres are distributed evenly across the said conveyor 24 by means of a lay blade 25 which is pivoted at the forward inner edge of the conveyor 24. Thus, by this process a mat 27 of the fibres is formed on each of the conveyor belts 24. These separate mats each contain a single type of fibre. The conveyor belts 24 deposit these mats 27 in a superimposed relation to each other on a conveyor belt 26 to form a composite multi-layer mat 27a as shown in Fig. 9. Fig. 10 shows a sectional view taken through the composite multi-layer mat 27a formed by this process and shows the separation of the three kinds of fibres.

Figure 6:
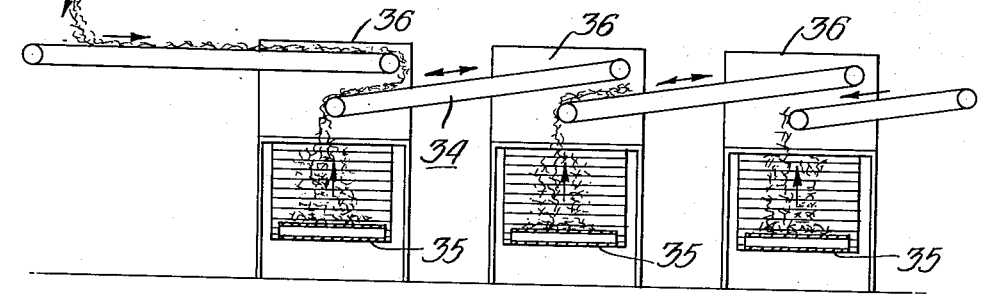
Figure 7:
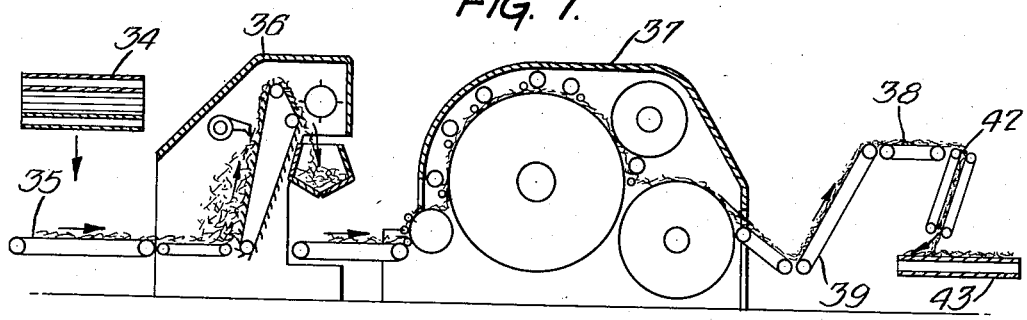
Figure 8:
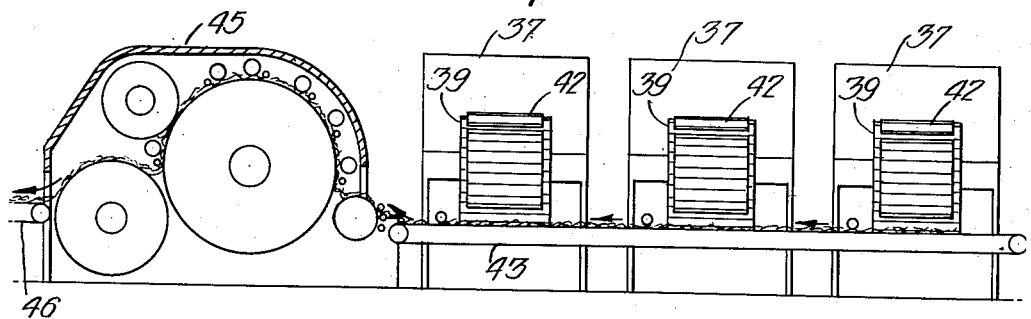

The composite multi-layer mat 27a is deposited onto a conveyor 28 which feeds the fibres to a picker 29. The feed rolls 30 of the picker 29 feed vertical sections of the composite multi-layer mat 27a to the picker roll 31. These portions of the composite multi-layer mat 27a are in turn picked up by a condenser 32 similar to the aforementioned condenser 14 which removes the fibres from the picker 29 by suction through a duct 33 and deposits them onto a conveyor system, generally designated 34, as shown in Fig. 6. This conveyor system 34 comprises four conveyor belts of the type shown in U. S. Patent No. 2,360,583, the two center ones being reversible so that fibres may be selectively deposited on any one or all of the conveyors 35 leading to the automatic weighing feeds 36.

The automatic weighing feeds 36 continuously feed a predetermined amount of fibres into a series of initial carding machines 37 where the fibres are carded and formed into a web 38. The webs 38 from the carding machines are cross-laid on feed conveyor 43 by intermediate feed 42, forming a heavy bat or lap. In the present embodiment, three carding machines 37 are provided, but it will be observed that any number of carding machines 37 may be used. The number of carding machines used depends mainly on the difficulty of blending the various kinds of fibres together.

As shown in Fig. 11, the three intermediate feeds 42 lap the webs 38 back and forth upon each other across a conveyor belt 43 to form a composite multi-layer web 44 thereon. Thus the present system provides a web having a very equal distribution of fibres as shown in Fig. 12. The conveyor belt 43 feeds the web 44 into the final carding machine 45 where the fibres are subjected to a further carding process and discharged onto a conveyor 46. From here the web may be further processed as desired.

Figure 13:
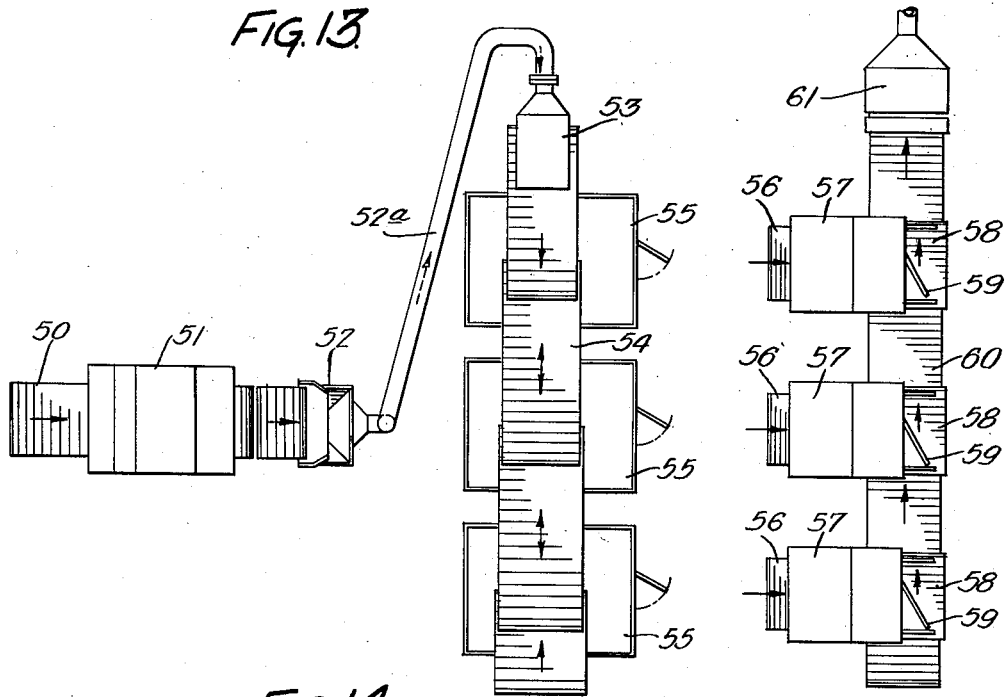
Figs. 13 and 14 are schematic plan views showing modifications in arrangement of machines in the initial stage of the blending system.

A modification of the present invention is shown in Fig. 13. In this embodiment heavy masses of fibres taken from bales are placed on a conveyor belt 50 leading to a preparatory opener 51 similar to the aforementioned opener 11. The fibres are discharged from the breaker feed 51 into a hopper 52 and fed by suction through ducts 52a to a condenser 53. The fibres are deposited by the condenser 53 onto a conveyor system designated generally 54. The conveyor system 54 is of the type previously described and consists of four conveyor belts, the two center ones of which are reversible so that the fibre deposited on the conveyor system may be discharged into any one of the three storage rooms 55. The present modification is designed for the use of blending three different types of fibre but it will be observed, however, that by increasing the number of storage rooms 55, any number of types of fibres may be blended.

The fibres are removed manually from the storage rooms 55 and placed on a conveyor belt 56 leading into an automatic weighing feed 57. A separate weighing feed is provided for each of the storage rooms so that up to this point there is no blending or mixing of any of the different types of fibres. The fibres are discharged from the weighing feed 57 onto a conveyor belt 58 in a manner similar to that previously described, wherein the fibres were discharged from the weighing feed 21 onto a conveyor belt 24. The fibres are distributed across the width of the conveyor belt 58 to form a mat thereon by means of a lay blade 59 pivoted at the forward inner edge of the conveyor 58. The conveyor belts 58 then deposit these mats in a superimposed relation to each other on a conveyor belt 60 to form a composite multi-layer mat. The conveyor belt 60 in turn deposits this composite multi-layer mat into a picker 61 from which it is removed by a condenser (not shown).

Figure 14:
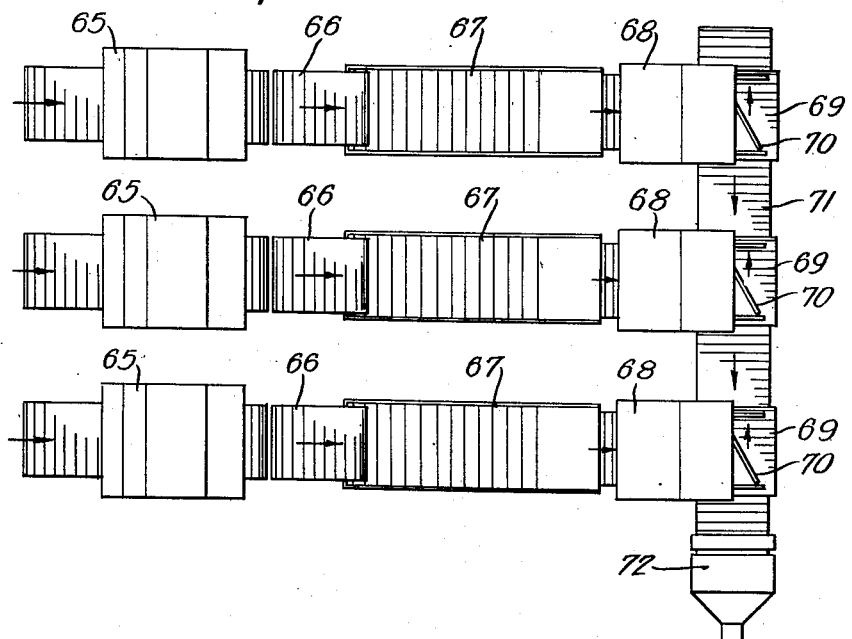

A further modification of the present invention is shown in Fig. 14. In this embodiment a separate breaker feed 65 is provided for each of the different types of fibres blended by the system. In the present instance, means are provided for blending three different types of fibres, but as before a greater number of different types of fibres may be blended by increasing the number of breaker feeds used. The fibres are discharged from the breaker feeds 65 onto an upwardly inclined conveyor belt 66 leading to distributor bins 67. The fibres are moved forward in the distributing bins 67 by conveyors (not shown), and fed to automatic weighing feeds 68 which, in turn, feed the fibres onto conveyor belts 69. The fibres are distributed across the width of the conveyor belts 69 by means of lay lades 70 to form a mat thereon. The conveyor belts 69 deposit the mat formed thereon in a superimposed relation to each other on a conveyor belt 71 to form a composite multi-layer mat. The conveyor belt 71 in turn feeds this composite multi-layer mat into a picker 72 from which it is removed by a condenser (not shown).

A still further modification of the present invention is shown in Fig. 15. In this instance the mixed fibres are discharged from a condenser 75 onto a conveyor belt 76. The condenser 75 may be connected to the pickers 61 or 72 described in two previous modifications or may be attached to the picker 29 shown in Fig. 1. The fibres deposited on the conveyor belt 76 are fed into an automatic weighing feed 77 which feeds a predetermined amount of fibre onto a conveyor belt 78 leading into a carding machine 79.

The fibre is discharged from the carding machine 79 in the form of four thin strips and is deposited on a former 80. The former 80 comprises a unitary structure having a plurality of triangular portions 81 corresponding in number to the number of strips discharged from the carding machine 79. The strips of fibre are drawn over the former 80 and deposited onto conveyor belts 82 and 83 running at substantially right angles to the longitudinal axis of the carding machine 79. Two strips are placed in a superimposed relation on each of the abovementioned conveyor belts. The conveyor belts 82 and 83 feed the fibre into intermediate feeds 84 and 85 respectively which, in turn, lap the fibre back and forth horizontally across conveyor belts 86 and 87 leading into carding machines 88.

As shown in Fig. 17, eight separate webs 89 are discharged from the carding machine 88 and gathered together into four loose rolls of fibre which are then coiled in the usual multiple-can coiler 90. This modification may be used on any one or all of the initial carding machines 37 shown in the embodiment in Fig. 1, or may be used in place of the final carding machine 45 shown in Fig. 1.

While certain embodiments of the present invention have been illustrated and described herein, it is not intended to limit the invention to such disclosures, and changes and modifications may be incorporated and embodied therein within the scope of the following claims.

We claim:

1. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing devices, a plurality of feed conveyors arranged with one conveyor associated with each distributing device and selectively operable at will to feed fibres to said distributing devices, a single conveyor extending in common to said weighing devices, and an intermediate conveyor interposed between each weighing device and the single conveyor operable to receive and form into mats the fibres discharged from said weighing feeds and including cooperating means to deposit said mats in respectively superimposed relation upon said single conveyor to provide multi-layer mat of the fibres.

2. In fibre blending apparatus, a plurality of automatic weighing devices operable to receive fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to second secondary weighing devices.

3. In fibre blending apparatus, a plurality of automatic weighing devices operable to receive fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same into lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, and conveyor means operable to receive the fibres from each secondary weighing device and deliver the same to the associated card.

4. In fibre blending apparatus, a plurality of automatic weighing devices operable to receive the fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, and conveyor means including overlapping devices operable to receive fibre webs discharged from said cards and deposit the same back and forth in substantially overlapping relation upon said delivery conveyor to form a composite multi-layer web having a homogeneous distribution of the fibres.

5. In fibre blending apparatus, a plurality of automatic weighing devices operable to receive the fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, conveyor means including overlapping devices operable to receive the fibre webs discharged from said cards and deposit the same back and forth in substantially overlapping relation upon said delivery conveyor to form a composite multi-layer web having a homogeneous distribution of the fibres, and a final card to receive and process said composite multi-layer web of fibres.

6. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device.

7. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing devices, a single conveyor extending in common to said weighing devices, and mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each second weighing device and selectively operable at will to receive said batches of fibres and feed the same to said secondary weighing device, a card associated with each secondary weighing device, and conveyor means operable to receive the fibres from each secondary weighing device and deliver the same to the associated card.

8. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, and conveyor means including lapping devices operable to receive the fibre webs discharged from said cards and deposit the same back and forth in substantially overlapping relation upon said delivery conveyor to form a composite multi-layer web having a homogeneous distribution of the fibres.

9. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing devices, a single conveyor extending in common to said weighing devices, and mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, and conveyor means including lapping devices operable to receive the fibre webs discharged from said cards and deposit the same back and forth in substantially overlapping relation upon said delivery conveyor to form a composite multi-layer web having a homogeneous distribution of the fibres, and a final card to receive and process said composite multi-layer web of fibres.

10. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate of said weighing device, a plurality of feed conveyors arranged with one conveyor associated with each distributing device and selectively operable at will to feed fibres to said distributing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing devices.

11. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing device, a plurality of feed conveyors arranged with one conveyor associated with each distributing device and selectively operable at will to feed fibres to said distributing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device, and conveyor means operable to receive the fibres from each secondary weighing device and deliver the same to the associated card.

12. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing device, a plurality of feed conveyors arranged with one conveyor associated with each distributing device and selectively operable at will to feed fibres to said distributing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, and conveyor means including lapping devices operable to receive the fibre webs discharged from said cards and deposit the same back and forth in substantially overlapping relation upon said delivery conveyor to form a composite multi-layer web having a homogeneous distribution of the fibres.

13. In fibre blending apparatus, a plurality of automatic weighing devices operable to receive fibres and discharge the same in lots of predetermined uniform weight, a plurality of storage and distributing devices corresponding in number to said weighing devices operable to receive fibres and deliver the same at a continuous uniform rate to said weighing device, a plurality of feed conveyors arranged with one conveyor associated with each distributing device and selectively operable at will to feed fibres to said distributing devices, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means operable to break down said multi-layer mat into successive batches of fibres, a plurality of secondary automatic weighing devices operable to receive fibres and to discharge the same in lots of predetermined uniform weight, a set of a plurality of conveyors arranged with one conveyor associated with each secondary weighing device and selectively operable at will to receive said batches of fibres and feed the same to said secondary weighing device, a card associated with each secondary weighing device operable to card the fibres into webs, conveyor means operable to receive the fibres from each secondary weighing device and deliver the same to the associated card, a single delivery conveyor extending transversely of said cards, conveyor means including lapping devices operable to receive the fibre webs discharged from said cards and deposit the same back and forth in substantially overlapping relation upon said delivery conveyor to form a composite multi-layer web having a homogeneous distribution of the fibres, and a final card to receive and process said composite multi-layer web of fibres.

14. In fibre blending apparatus, a plurality of automatic weighing devices operable to receive fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means to sever said multi-layer mat into successive sections thereof, a second automatic weighing device to receive fibres and discharge the same in lots of predetermined uniform weight, a card associated with said second automatic weighing device operable to receive said lots of fibres and form the same into a plurality of webs, second conveyor means extending transversely of said card, a forming member comprising a plurality of web directing portions each having an edge arranged at an acute angle to the direction of movement of said webs and operable to guide and deposit the webs into superimposed relation on said conveyor means, delivery conveyor means adjacent said second conveyor, and lapping devices operable to receive the webs from said second conveyor means and deposit the same back and forth in substantially overlapping relation upon said delivery conveyor thereby forming a composite multi-layer web having a homogeneous distribution of fibres on said second conveyor means.

15. In fibre blending apparatus, a plurality of automatic weighing devices operable to receive fibres and discharge the same in lots of predetermined uniform weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, means to sever said multi-layer mat into successive sections thereof, a second automatic weighing device to receive fibres and discharge the same in lots of predetermined uniform weight, a card associated with said second automatic weighing device operable to receive said lots of fibres and form the same into a plurality of webs, second conveyor means extending transversely of said card, a forming member comprising a plurality of web directing portions each having an edge arranged at an acute angle to the direction of movement of said webs and operable to guide and deposit the webs into superimposed relation on said conveyor means, delivery conveyor means adjacent said second conveyor, lapping devices operable to receive the webs from said second conveyor means and deposit the same back and forth in substantially overlapping relation upon said delivery conveyor thereby forming a composite multi-layer web having a homogeneous distribution of fibres on said second conveyor means, and a final card to receive and process said composite multi-layer web of fibres.

16. In fibre blending apparatus, a plurality of breaker feeds for breaking up large clumps of fibres, a plurality of storage chambers corresponding in number to said breaker feeds into which fibres are discharged from said breaker feeds, a plurality of automatic weighing devices corresponding in number to said chambers and arranged to receive fibres therefrom and discharge the same in lots of predetermined uniform weight, a single conveyor extending in common to said weighing devices, and mechanism associated with each weighing device operable to receive and form into mats the fibres discharged therefrom and deposit said mats in respectively superimposed relation upon said single conveyor to provide a multi-layer mat of the fibres.

17. In fibre blending apparatus, a plurality of automatic weighing devices operable to receive fibres and discharge the same in lots of predetermined weight, a single conveyor extending in common to said weighing devices, mechanism associated with each weighing device operable to receive and form into mats the fibres discharged therefrom and deposit said mats in respectively superimposed relation upon said single conveyor to provide a multi-layer mat of the fibres, a plurality of secondary automatic weighing devices operable to receive fibres from said multi-layer mat and discharge the same in lots of predetermined weight, and feed conveyors for said secondary weighing devices selectively operable at will to feed fibres from said multi-layer mat to said secondary weighing devices.

JOHN H. SENIOR.
HARMON B. RIEHL.

References Cited in the file of this patent

UNITED STATES PATENTS

| Number | Name | Date |
|---|---|---|
| 551,800 | Tilston | Dec. 24, 1895 |
| 1,346,828 | Kido | July 20, 1920 |
| 1,856,287 | Nuttall et al. | May 3, 1932 |
| 1,929,344 | Benoit | Oct. 3, 1933 |
| 2,055,412 | Hurst et al. | Sept. 22, 1936 |
| 2,107,458 | Walsh | Feb. 8, 1938 |
| 2,227,175 | Benoit | Dec. 31, 1940 |
| 2,261,842 | Brennan | Nov. 4, 1941 |
| 2,412,506 | Greene et al. | Dec. 10, 1946 |
| 2,433,790 | Senior | Dec. 30, 1947 |
| 2,467,291 | Brelsford et al. | Apr. 12, 1949 |